United States Patent
Park et al.

(10) Patent No.: US 10,447,445 B2
(45) Date of Patent: Oct. 15, 2019

(54) DEVICE AND METHOD FOR TRANSMITTING REFERENCE SIGNAL

(71) Applicant: Electronics and Telecommunications Research Institute, Daejeon (KR)

(72) Inventors: Ok-Sun Park, Daejeon (KR); Cheulsoon Kim, Daejeon (KR); Gi Yoon Park, Daejeon (KR); Changhee Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 96 days.

(21) Appl. No.: 15/403,498

(22) Filed: Jan. 11, 2017

(65) Prior Publication Data
US 2017/0201362 A1    Jul. 13, 2017

(30) Foreign Application Priority Data

Jan. 11, 2016 (KR) .................. 10-2016-0003424
Jan. 18, 2016 (KR) .................. 10-2016-0005895
Jan. 9, 2017 (KR) .................. 10-2017-0003119

(51) Int. Cl.
*H04L 5/00* (2006.01)
*H04W 72/04* (2009.01)

(52) U.S. Cl.
CPC ....... *H04L 5/0048* (2013.01); *H04W 72/0413* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 8,942,083 | B2 | 1/2015 | Choi et al. |
| 2010/0157918 | A1 | 6/2010 | Kim et al. |
| 2011/0090854 | A1* | 4/2011 | Montojo ............... H04L 5/0007 370/329 |
| 2011/0268102 | A1* | 11/2011 | Zhu ........................ H04L 5/003 370/345 |
| 2014/0112289 | A1 | 4/2014 | Kim et al. |
| 2015/0098369 | A1 | 4/2015 | Song et al. |

(Continued)

FOREIGN PATENT DOCUMENTS

| WO | WO 2014/157921 A1 | 10/2014 |
| WO | WO 2016/064218 A2 | 4/2016 |

OTHER PUBLICATIONS

"Uplink DMRS design for NB-IoT" R1-160125, ETRI, 3GPP TSG RAN WG NB-IoT Ad-Hoc Meeting Budapest, Hungary, Feb. 18-20, 2016, (3 pages).

(Continued)

*Primary Examiner* — Alex Skripnikov
(74) *Attorney, Agent, or Firm* — Staas & Halsey LLP

(57) ABSTRACT

In a system supporting narrowband Internet of things (NB-IoT), a terminal maps an uplink reference signal to a plurality of resource elements in a scheduled resource allocation unit, and transmits the uplink reference signal mapped to the plurality of resource elements. Here, the scheduled resource allocation unit includes a first number of contiguous slots in a time domain and a second number of contiguous subcarriers in a frequency domain.

15 Claims, 10 Drawing Sheets

(56) References Cited

U.S. PATENT DOCUMENTS

| | | | | |
|---|---|---|---|---|
| 2016/0006548 A1* | 1/2016 | Yang | ..................... | H04L 5/0094 370/329 |
| 2016/0029371 A1* | 1/2016 | Yang | ..................... | H04L 5/0094 370/329 |
| 2017/0134129 A1* | 5/2017 | You | ......................... | H04W 4/70 |
| 2017/0187499 A1* | 6/2017 | Hwang | ................. | H04L 5/0051 |
| 2017/0366380 A1* | 12/2017 | Hwang | ............... | H04L 27/2613 |

OTHER PUBLICATIONS

"3rd Generation Partnership Project; Technical Specification Group Radio Access Network; Evolved Universal Terrestrial Radio Access (E-UTRA); Physical channels and modulation (Release 13)" 3GPP TS 36.211, V13.2.0, (Jun. 2016), pp. 1-168.

"3rd Generation Partnership Project; Technical Specification Group Radio Access Network; Evolved Universal Terrestrial Radio Access (E-UTRA); Physical channels and modulation (Release 12)" 3GPP TS 36.211, V12.5.0, (Mar. 2015), pp. 1-136.

* cited by examiner

DEVICE AND METHOD FOR TRANSMITTING REFERENCE SIGNAL

CROSS-REFERENCE TO RELATED APPLICATION

This application claims priority to and the benefit of Korean Patent Application Nos. 10-2016-0003424, 10-2016-0005895, and 10-2017-0003119 filed in the Korean Intellectual Property Office on Jan. 11, 2016, Jan. 18, 2016, and Jan. 9, 2017, respectively, the entire contents of which are incorporated herein by reference.

BACKGROUND OF THE INVENTION (a) Field of the Invention

The present invention relates to a device and method for transmitting a reference signal and, more particularly, to a device and method for transmitting a reference signal in a narrowband Internet of things (NB-IoT) system.

(b) Description of the Related Art

A wireless communication system has a minimum unit of time resource for data transmission. A long-term evolution (LTE) system defines a minimum unit of time resource as a transmission time interval (TTI). In the LTE system, a TTI corresponds to a length of two slots, and a length of one slot corresponds to a length of seven symbols.

Also, in a wireless communication system, a prearranged signal is transmitted between a transmitter and a receiver for channel estimation in the receiver. The LTE system defines a signal prearranged between the transmitter and the receiver for channel estimation of the receiver, as a reference signal (RS). In uplink, the RS includes a demodulation RS (DMRS) and a sounding RS (SRS). Such an RS, a minimum allocation unit of radio resource, has a fixed pattern. The LTE system defines a minimum allocation unit of radio resource as a resource block (RB), and the RB includes twelve subcarriers and seven symbols. In particular, in the LTE system, an uplink resource is allocated as an RB pair in one uplink subframe.

Meanwhile, in the NB-IoT system, uplink resource allocation permits dynamic scheduling in a subcarrier unit. Thus, the NB-IoT system requires a reference signal allocation method different from that of an existing LTE system.

SUMMARY OF THE INVENTION

The present invention has been made in an effort to provide a reference signal transmitting method and device appropriate for an NB-IoT system.

An example embodiment of the present invention provides a method for transmitting an uplink reference signal by a terminal of a system supporting narrowband Internet of things (NB-IoT). The method for transmitting an uplink reference signal includes: generating an uplink reference signal corresponding to a plurality of resource elements in a scheduled resource allocation unit; and mapping the uplink reference signal to the plurality of resource elements, wherein the scheduled resource allocation unit includes a first number of contiguous slots in a time domain and a second number of contiguous subcarriers in a frequency domain.

When the second number is 1, the uplink reference signal may be generated using a physical cell identifier for NB and the first number.

When the second number is 2 or greater, the uplink reference signal may be generated using a physical cell identifier for NB.

The uplink reference signal may include a demodulation reference signal (DMRS).

The first number may be 2 or greater, and the second number may be 1 or greater.

The slot may include a plurality of symbols and the mapping may include allocating the uplink reference signal to one symbol in each of the first number of slots.

The slot may include a plurality of symbols and the mapping may include allocating the uplink reference signal to at least one symbol contiguously in a time axis in at least one of the first number of slots.

The mapping may include: mapping the uplink reference signal to the second number of subcarriers in order; increasing a symbol index; and repeating the mapping of the uplink reference signal to the second number of subcarriers in order and the increasing of the symbol index.

The mapping may include: mapping the uplink reference signal to the allocated symbols of the first number of slots in order; increasing a subcarrier index; and repeating the mapping of the uplink reference signal to the allocated symbols of the first number of slots in order and the increasing of the subcarrier index.

The generating may include: generating the uplink reference signal using the product of a first signal having a length corresponding to the first number of slots and a second signal having a length corresponding to the second number of subcarriers.

The first signal or the second signal may be generated using a constant amplitude zero auto-correlation (CAZAC) sequence.

The generating may include: generating the uplink reference signal from a base sequence having a length corresponding to the product of a length corresponding to the first number of slots and a length corresponding to the second number of subcarriers.

The base sequence may be generated to have pseudo-noise (PN) properties or orthogonality.

The base sequence may be generated by the product of a sequence having pseudo-noise (PN) properties and a sequence having orthogonality.

Another exemplary embodiment of the present invention provides a device for transmitting an uplink reference signal in system supporting narrowband Internet of things (NB-IoT), The reference signal transmitting device includes: a processor generating a demodulation reference signal (DMRS) corresponding to a plurality of resource elements in a scheduled resource allocation unit and mapping the DMRS to the plurality of resource elements, the scheduled resource allocation unit may include a first number of contiguous slots equal to or greater than 2 in a time domain and a second number of contiguous subcarriers equal to or greater than 1 in a frequency domain, and each of the first number of slots may include a plurality of symbols.

When the second number is 1, the processor may generate the DMRS using a physical cell identifier for NB and the first number.

When the second number is 2 or greater, the processor may generate the DMRS using a physical cell identifier for NB.

The processor may map the DMRS to one symbol in each of the first number of slots or map the DMRS to at least one symbol contiguously in a time axis in at least one of the first number of slots.

The processor may generate the DMRS from the product of a time domain signal having a first length and a frequency domain signal having a second length, map the DMRS to the second number of subcarriers, and sequentially map the DMRS to allocated symbols of the first number of slots.

The processor may first map the DMRS to the second number of subcarriers among the plurality of resource elements and subsequently increase a symbol index, or first map the DMRS to the allocated symbols of the first number of slots among the plurality of reference elements and subsequently increase a subcarrier index.

DETAILED DESCRIPTION OF THE EMBODIMENTS

Figure 1:
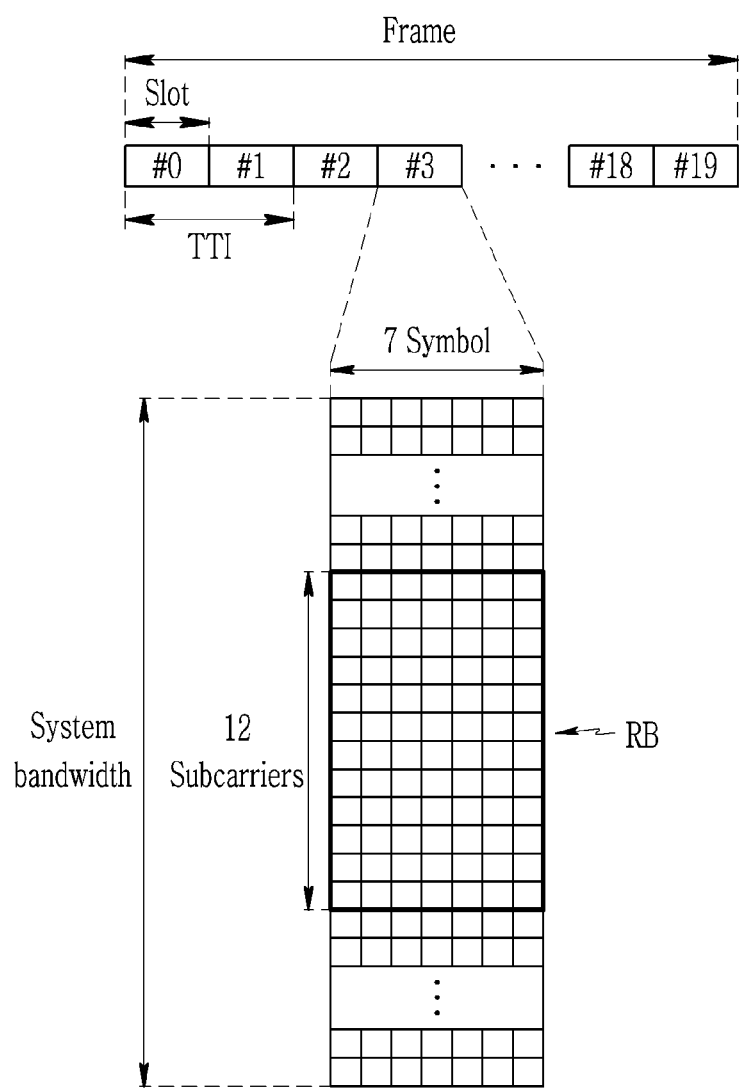
FIG. 1 is a view illustrating an example of a frame structure of an LTE system.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Throughout the specification, a terminal may refer to a mobile terminal (MT), a mobile station (MS), an advanced mobile station (AMS), a high reliability mobile station (HR-MS), an subscriber station (SS), a portable subscriber station (PSS), an access terminal (AT), or a user equipment (UE), and may include the entirety or a portion of functions of the MT, MS, AMS, HR-MS, SS, PSS, AT, or UE.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (BSs) (e.g., a femto base station (BS), a home node B (HNB), a home eNodeB (HeNB), a pico BS, a metro BS, a micro BS, etc.), and the like, and may include the entirety or a portion of functions of an ABS, a node B, an eNodeB, an AP, an RAS, a BTS, an MMR-BS, an RS, an RN, an ARS, an HR-RS, a small BS, and the like.

Hereinafter, a reference signal transmitting method and device according to an exemplary embodiment of the present invention will be described in detail with reference to the accompanying drawings.

FIG. 1 is a view illustrating an example of a frame structure of an LTE system.

Referring to FIG. 1, in an LTE system, one frame includes twenty slots #0 to #19 having a length of 0.5 ms in a time domain, and two slots constitute one subframe.

The LTE system defines a minimum unit of time resource for transmitting data, as a transmission time interval (TTI), and the TTI has a length of one subframe.

One slot includes a plurality of symbols in the time domain and includes a plurality of subcarriers in a frequency domain. A symbol may be referred to as an orthogonal frequency division multiplex (OFDM) symbol, an OFDMA symbol, a single carrier-frequency division multiple access (SC-FDMA) symbol, and the like, depending on a multi-access scheme. The number of symbols included in one slot may be variously changed according to channel bandwidths or lengths of a cyclic prefix (CP). For example, in the case of a normal CP, one slot includes seven symbols, while, in the case of an extended CP, one slot includes six symbols.

Also, in the LTE system, a minimum allocation unit of radio resource is defined as a resource block (RB), and one RB may include twelve subcarriers and seven symbols in the case of the normal CP.

In general, an uplink reference signal (RS) of the LTE system is mapped entirely using one of symbols that belong to a scheduled RB. Meanwhile, in the LTE system, in uplink, an RS includes a demodulation RS (DMRS) and a sounding RS (SRS). The DMRS is an RS for obtaining channel information for demodulation of uplink data, and the SRS is an RS used for measuring an uplink channel.

Figure 2:
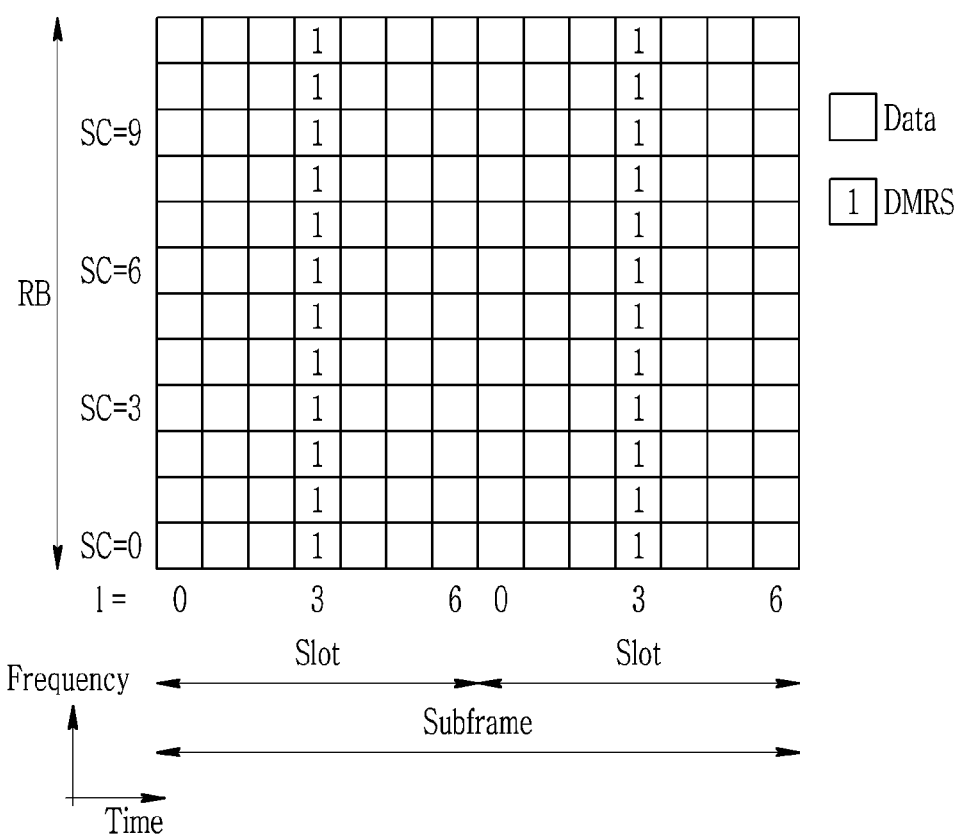
FIG. 2 is a view illustrating an example of a DMRS allocation method in an LTE system.

FIG. 2 is a view illustrating an example of a DMRS allocation method in an LTE system. In FIG. 2, a DMRS allocation method in a normal CP is illustrated.

Referring to FIG. 2, one symbol is used for DMRS transmission in one slot.

A base station (BS) of a serving cell allocates a physical uplink shared channel (PUSCH) to a terminal through uplink grant. In an RB (SC=0, . . . , SC=11, I=0, . . . , I=6) corresponding to the PUSCH, a symbol for DMRS transmission (hereinafter, referred to as a "DMRS symbol") is allocated to each slot.

In general, in the case of a normal CP, a symbol index I to which the DMRS symbol is allocated is 3, and in the case of an extended CP, a symbol index I to which the DMRS symbol is allocated is 2.

Figure 3:
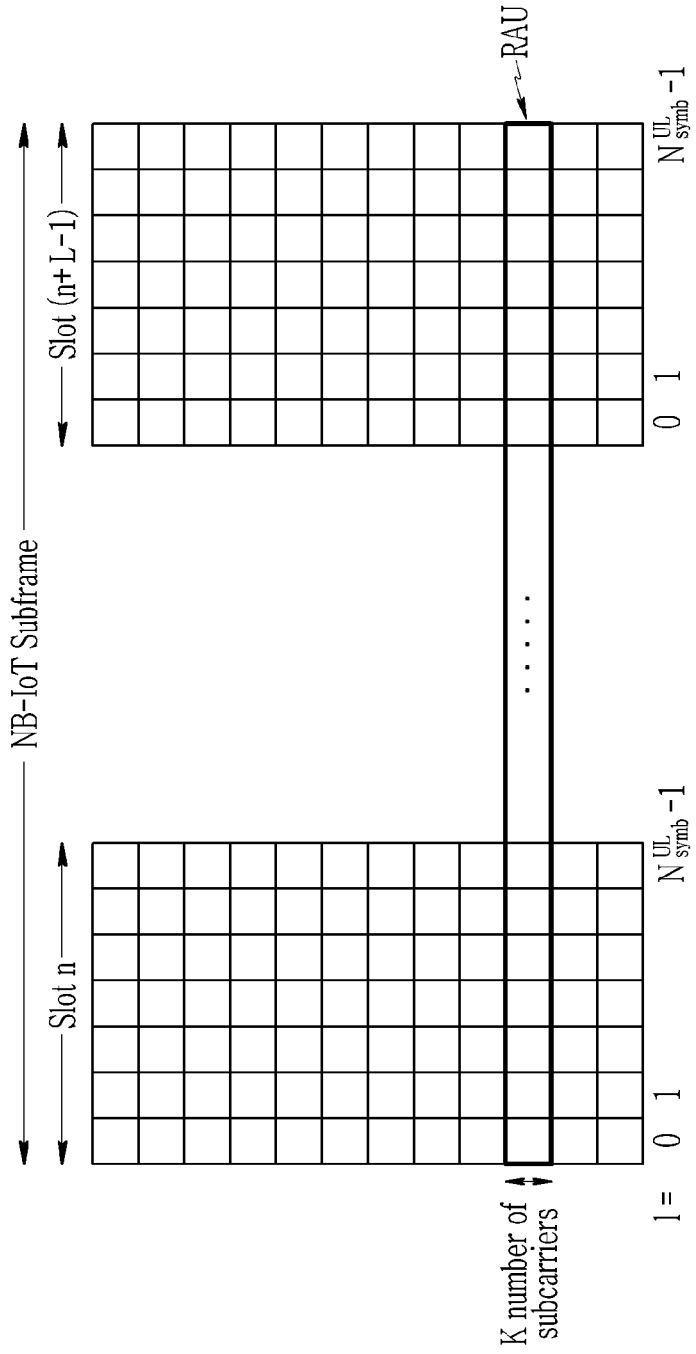
FIG. 3 is a view illustrating an uplink resource grid of a system supporting NB-IoT according to an exemplary embodiment of the present invention.

FIG. 3 is a view illustrating an uplink resource grid of a system supporting NB-IoT according to an exemplary embodiment of the present invention.

Referring to FIG. 3, a system supporting NB-IoT (hereinafter, referred to as an "NB-IoT system") operates in three scenarios. In an in-band scenario, an NB-IoT spectrum is frequency-division-multiplexed in an LTE spectrum of a bandwidth of an LTE system. In a guard-band scenario, the NB-IoT spectrum is frequency-division-multiplexed in a guard band of an LTE spectrum. In a stand-alone scenario, the NB-IoT spectrum is allocated from a global system for mobile communication (GSM) so as to be operated independently from GSM.

In the LTE system, an uplink resource is allocated in units of an RB pair, but, in the NB-IoT system, dynamic scheduling is allowed and an uplink resource is allocated in unit of a subcarrier or in unit of an aggregation of predetermined number of subcarriers in the NB-IoT system.

In the NB-IoT system, one NB-IoT radio frame may include a plurality of NB-IoT subframes, and one NB-IoT subframe may include L number of slots. One slot duration may be set by the integer multiple of 0.5 ms, and the exact duration may vary depending on the specified subcarrier spacing. L may be previously determined in standards or higher layer configured according to coverage class in accordance with a location of a terminal supporting NB-IoT in a BS.

In the NB-IoT system, a minimum allocation unit of radio resource for uplink transmission is defined as a resource allocation unit (RAU). In the case of 15 KHz subcarrier spacing, a certain K (for example, K=1, 2, . . . , 12, or K=1, 3, 6, 12) number of subcarriers may be allocated to one RAU, and in the case of 3.75 KHz subcarrier spacing, K is limited to 1 (K=1).

One RAU may include N number of resource elements (RE) as expressed by Equation 1.

$$N = K \cdot N_{symb}^{UL} \cdot L \qquad \text{(Equation 1)}$$

$$N_{symb}^{UL} = \begin{cases} 7 & \text{for normal cyclic prefix} \\ 6 & \text{for extended cyclic prefix} \end{cases}$$

In Equation 1, L denotes the number of slots of one NB-IoT subframe, $|N_{symb}^{UL}|$ denotes the number of symbols of one slot, and K denotes the number of subcarriers of one RAU.

An NB-IoT uplink subframe may be divided into a control region and a data region in a frequency domain like an LTE uplink subframe. A physical uplink control channel (PUCCH), a control channel, is allocated to the control region, and a PUSCH, a data channel, is allocated to the data region. For the purposes of description, a PUCCH and a PUSCH allocated to an NB-IoT uplink subframe will be referred to as an NB-IoT PUCCH and an NB-IoT PUSCH, respectively.

An NB-IoT terminal supporting NB-IoT may be positioned at a cell center or a cell edge. When the NB-IoT terminal is positioned at a cell center, since uplink transmission power is sufficient, a serving cell can configure a transmission mode of the NB-IoT terminal to NB-IoT TM 1. The NB-IoT terminal configured to NB-IoT TM 1 transmits an NB-IoT PUSCH one time. The NB-IoT terminal configured to NB-IoT TM 1 may appropriately perform link adaptation to the serving cell and uplink HARQ. Here, although the NB-IoT terminal transmits the NB-IoT PUSCH one time, one NB-IoT uplink subframe may be set to have a value of 1 ms or greater in order to demodulate the NB-IoT PUSCH in the serving cell.

When the NB-IoT terminal is positioned in a cell edge, the serving cell may configure a transmission mode of the NB-IoT terminal to NB-IoT TM 2. The NB-IoT terminal set to NB-IoT TM 2 repeatedly transmits NB-IoT PUSCHs using the same MCS and the same RAU across several NB-IoT subframes several times, and the NB-IoT terminal performs uplink retransmission on the NB-IoT PUSCHs.

Since uplink transmission power is insufficient at a cell center and a bandwidth of the uplink system is limited to 180 KHz, the NB-IoT terminal may not be able to exploit the frequency diversity. Thus, as illustrated in FIG. 3, one NB-IoT uplink subframe may be formed using L number of slots.

Figure 4:
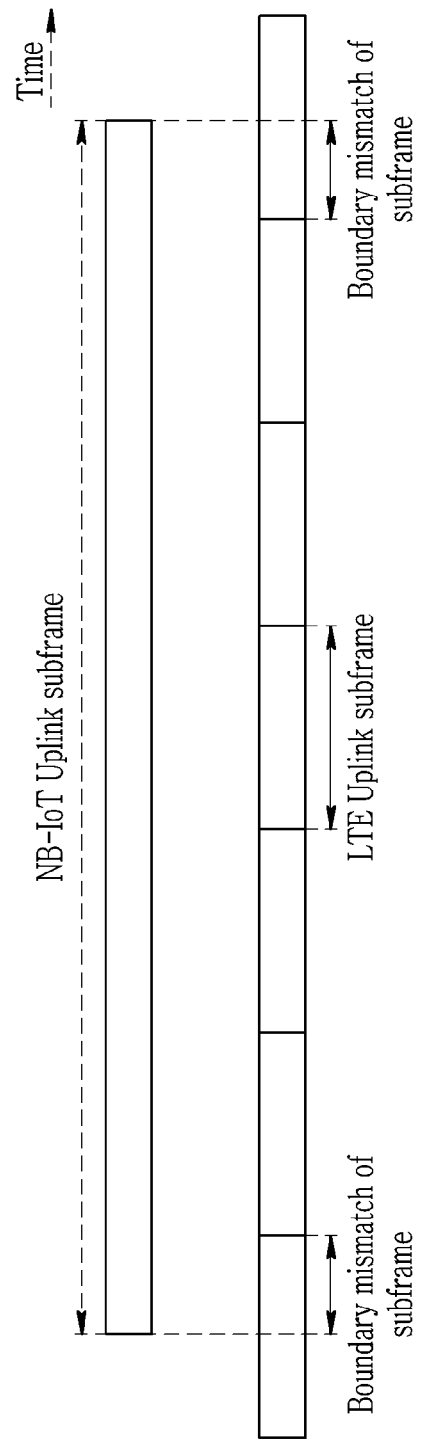
FIG. 4 is a view illustrating an example of a boundary mismatch between an NB-IoT uplink subframe according to an exemplary embodiment of the present invention and an LTE uplink subframe.

FIG. 4 is a view illustrating an example of a boundary mismatch between an NB-IoT uplink subframe according to an exemplary embodiment of the present invention and an LTE uplink subframe.

Referring to FIG. 4, when a length of one slot in an NB-IoT uplink subframe is Tslot, since the NB-IoT uplink subframe has a length of (L×Tslot) ms, LTE uplink interference may be significantly changed within one NB-IoT uplink subframe. In FIG. 4, an NB-IoT uplink subframe in which L is 12 (L=12) is illustrated. Unless the serving cell aligns the boundaries between an NB-IoT uplink subframe and an LTE uplink subframe, an interference level is changed within the NB-IoT uplink subframe, causing the mismatch between estimated uplink channel quality information obtained at an adjacent BS by means of SRS before the uplink scheduling and estimated uplink channel quality information obtained at an adjacent BS by means of DMRS.

Thus, in order to operate in an inband scenario, the NB-IoT uplink subframe and the LTE uplink subframe may operate by aligned boundaries.

Figure 5:
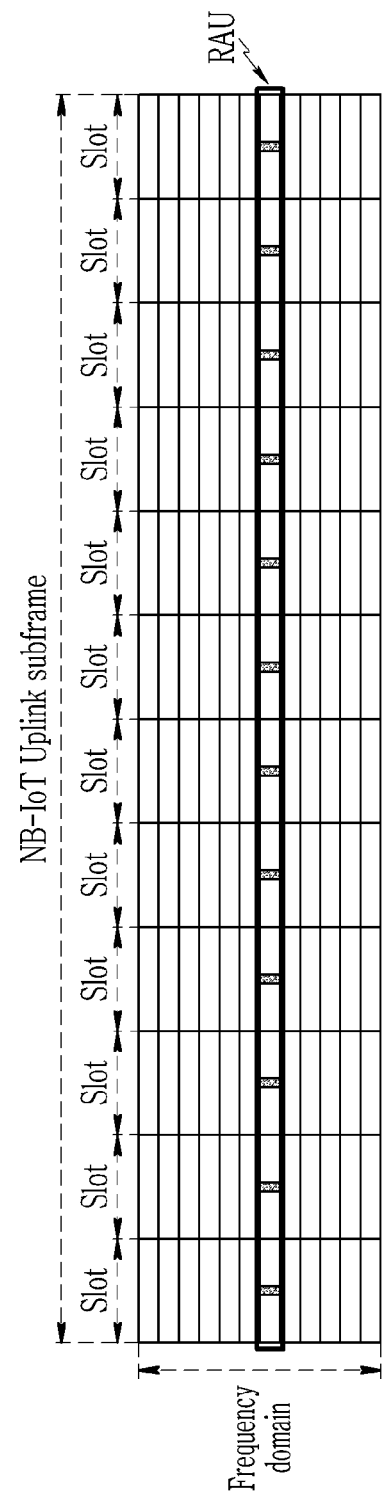
FIGS. 5 and 6 are views illustrating an example of a non-contiguous DMRS pattern in an NB-IoT system according to an exemplary embodiment of the present invention.
Figure 6:
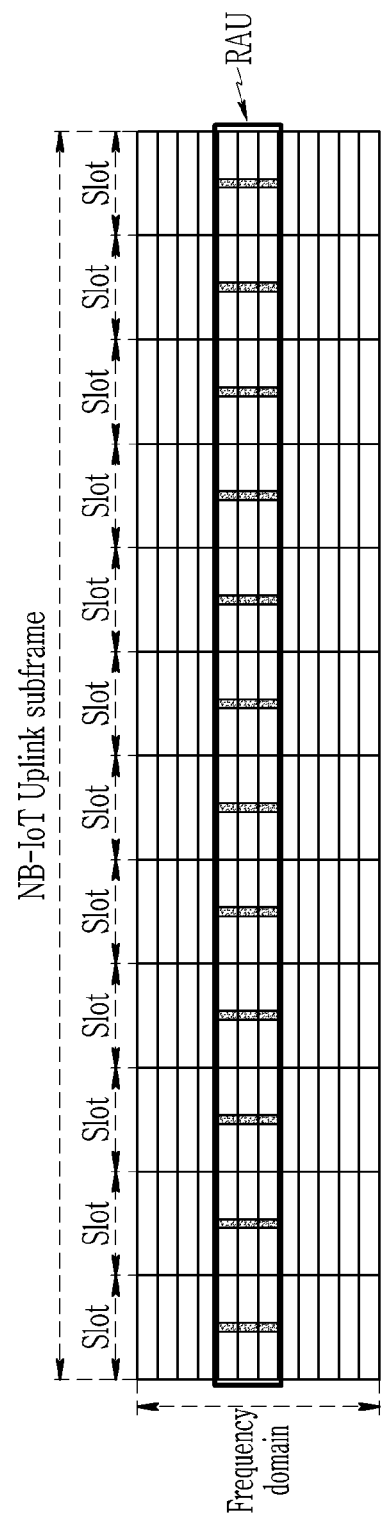
Figure 7:
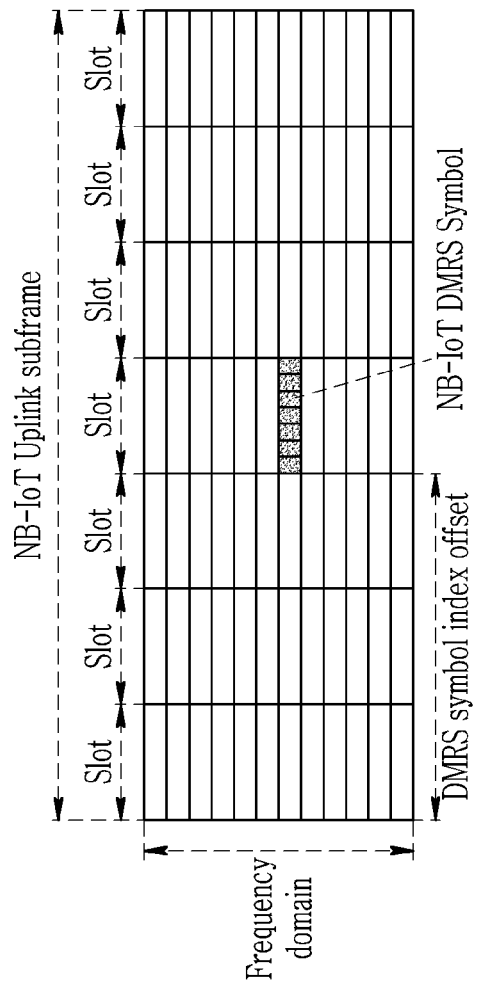
FIG. 7 is a view illustrating an example of a contiguous DMRS pattern in an NB-IoT system according to an exemplary embodiment of the present invention.

FIGS. 5 and 6 are views illustrating an example of a non-contiguous DMRS pattern in an NB-IoT system according to an exemplary embodiment of the present invention, and FIG. 7 is a view illustrating an example of a contiguous DMRS pattern in an NB-IoT system according to an exemplary embodiment of the present invention.

Referring to FIGS. 5 to 7, in the NB-IoT system, an uplink DMRS is used to estimate channel status information (CSI) with an NB-IoT terminal or perform scheduling in accordance with a channel in a serving cell. Hereinafter, for the purposes of description, an uplink DMRS in the NB-IoT system will be referred to as an "NB-IoT DMRS".

The NB-IoT DMRS is time-division-multiplexed with uplink data in order to meet requirements of peak-to-average power ratio (PAPR) and power amplifier efficiency. The cases of mapping of NB-IoT DMRS can be classified into a non-contiguous DMRS pattern case and a contiguous DMRS pattern case, according to RE mapping in the time domain.

In the case of the non-contiguous DMRS pattern, one NB-IoT DMRS symbol is allocated to each slot. In particular, in a case of LTE uplink slot hopping in an in-band scenario, since interference from an adjacent LTE cell is changed in units of slots, the NB-IoT uplink subframe undergoes an interference change L times. In order for a BS to estimate and/or track such interference, at least one NB-IoT DMRS symbol may be allocated to each slot in the NB-IoT system.

For example, as illustrated in FIG. 5, when L=12 and K=1 in the NB-IoT system using a normal CP, one NB-IoT DMRS symbol may be allocated to each of the twelve slots of one RAU. Here, an NB-IoT DMRS symbol index may be the same as a DMRS symbol index of the LTE system.

Also, as illustrated in FIG. 6, even in the case of K>1, one NB-IoT DMRS symbol may be allocated to each of the twelve slots. In order to reduce PAPR by utilizing single-carrier properties, K number of continuously adjacent subcarriers may be used.

Referring to FIG. 7, in the case of the contiguous DMRS pattern, NB-IoT DMRS symbols are contiguously allocated in one NB-IoT uplink subframe. In particular, when interference is not significantly changed within one NB-IoT uplink subframe, NB-IoT DMRS symbols may be contiguously allocated in a time axis. In this case, the NB-IoT DMRS symbols have the same channel response, and thus, an orthogonal cover code (OCC) may be applied to the NB-IoT DMRS symbols. Inter-cell or inter-terminal interference orthogonalization may be performed using the OCC. As the OCC, a DFT sequence or a constant amplitude zero auto-correlation (CAZAC) sequence having a length of an NB-IoT DMRS occasion duration indicating a duration in which an NB-IoT DMRS symbol is transmitted or received may be utilized. The length of the NB-IoT DMRS sequence can be considered as keeping the same proportion of occupation by the DMRS sequence of the LTE system within an LTE uplink subframe. That is, the length of the NB-IoT DMRS sequence may be defined by a ratio between the number of uplink symbols and the number of NB-IoT DMRS symbols in an NB-IoT uplink subframe. For example, as illustrated in FIG. 7, in a case where a DMRS symbol index offset is 3, L is 7 (L=7) in a normal CP, and a ratio between the number of uplink symbols and the number of DMRS symbols is 1/7, NB-IoT DMRS symbols may be contiguously allocated across one slot. The DMRS symbol index offset applied to such a case corresponds to 3, the same value as that of the symbol index occupied by the DMRS symbols, and thus, the slot index offset is illustrated as 3 in FIG. 7.

The serving cell may perform a single tone allocation and multi-tone application independently on every NB-IoT subframe to an NB-IoT terminal. The single tone and the multi-tone may use the same NB-IoT DMRS symbol index.

Figure 8:
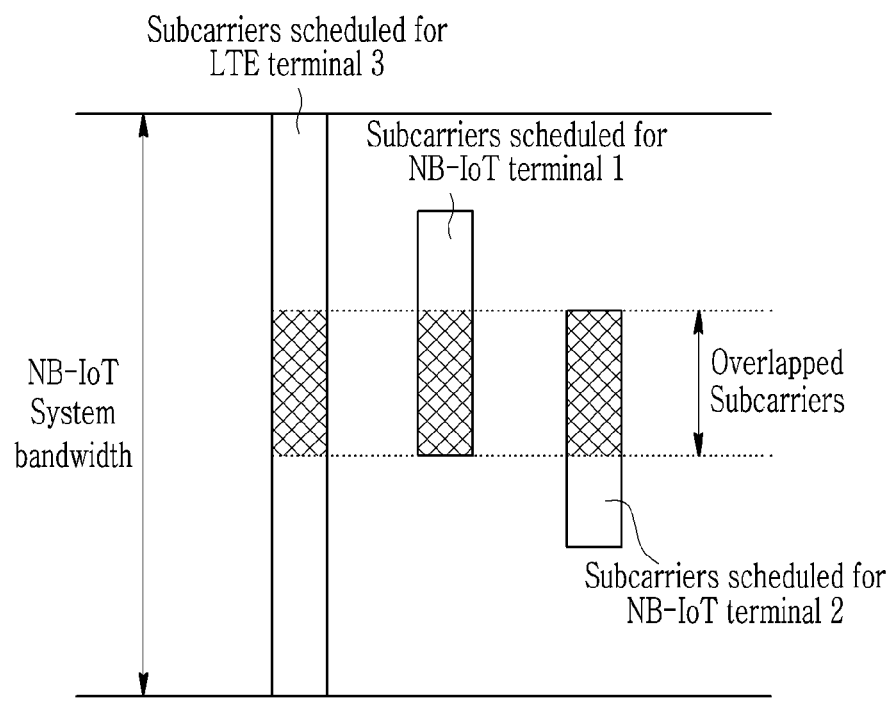
FIG. 8 is a view illustrating an example of subcarrier scheduling in an NB-IoT uplink subframe according to an exemplary embodiment of the present invention.

FIG. 8 is a view illustrating an example of subcarrier scheduling in an NB-IoT uplink subframe according to an exemplary embodiment of the present invention.

Referring to FIG. 8, since a plurality of terminals that belong to different cells may be scheduled with the same subcarriers, inter-cell interference may occur in overlapped subcarriers. Thus, the inter-cell interference that may occur in the overlapped subcarriers should be reduced.

For example, an NB-IoT terminal 1, an NB-IoT terminal 2, and an LTE terminal 3 belong to different cells. Since the NB-IoT terminal 1 and the NB-IoT terminal 2 perform uplink transmission by a single port, where a precoding for uplink multi-user-multi-input multi-output (MU-MIMO) may not be applied. Thus, parameters used for generating a DMRS sequence are set to be different in each terminal such that DMRSs of terminals that belong to different cells are distinguished, whereby a BS may suppress interference between DMRSs of terminals and distinguish each DMRS. Here, an NB-IoT DMRS symbol index may be set to be the same in each cell, regardless of the number of scheduled subcarriers. Here, in order to further reduce interference processed by the BS, in generating an NB-IoT DMRS using an orthogonal sequence, a parameter used for generating an NB-IoT DMRS may be set to allocate mutually orthogonal NB-IoT DMRSs to NB-IoT terminals, or in the case of applying a PN sequence in generating an NB-IoT DMRS, different PN sequences may be allocated to NB-IoT terminals.

Figure 9:
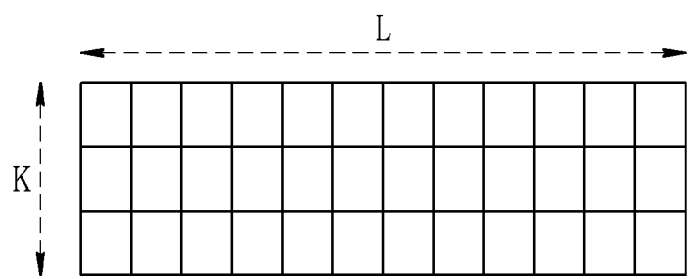
FIG. 9 is a view illustrating an example of a DMRS sequence according to an exemplary embodiment of the present invention.

FIG. 9 is a view illustrating an example of a DMRS sequence according to an exemplary embodiment of the present invention.

Referring to FIG. 9, since NB-IoT DMRSs are allocated to L×K number of resource elements within one NB-IoT subframe, an NB-IoT DMRS sequence may be generated in consideration of a two-dimensional structure in which an NB-IoT DMRS sequence has a length of K in a frequency domain and a length of L in a time domain or in consideration of a one-dimensional structure having to a length of (L×K). In FIG. 9, two-dimensional structure of an NB-IoT DMRS when L is 12 (L=12) and K is 3 (K=3) is illustrated.

An NB-IoT DMRS sequence $r_{NB\text{-}PUSCH}(\cdot)$ having a two-dimensional structure may be expressed as the product of a frequency domain signal $r(k)$ having a length of K and a time domain signal $w(l)$ having a length of L as expressed by Equation 2.

$$r_{NB\text{-}PUSCH}(l,k) = r(k)w(l) \qquad \text{(Equation 2)}$$

Here, $0 \leq l \leq L$ and $0 \leq k < K$.

The frequency domain signal $r(k)$ and the time domain signal $w(l)$ may be derived from a vector forming an orthogonal matrix or may be generated from a sequence having excellent correlation characteristics such as CAZAC, or the like. Examples of a vector forming such an orthogonal matrix may include a discrete Fourier transform (DFT) matrix, an identity matrix, a Walsh-Hadamard matrix, and the like, and examples of the sequence having CAZAC characteristics may include a Zadoff-Chu sequence used in LTE and a sequence generated by a computer to optimize the correlation coefficient. The sequence having the CAZAC characteristics may be generated to be the same as that defined in 3GPP TS 36.211 section 5.5.1. However, in such a case, in the case of L<12 or K<12, an LTE DMRS base sequence having a length of 12 may be truncated so as to be used as an NB-IoT DMRS sequence.

If a channel state of uplink is uniform during L number of slots transmitting an NB-IoT uplink DMRS, L number of symbols may be aggregated to generate an NB-IoT DMRS sequence, thereby obtaining a processing gain.

In generating the frequency domain signal $r(k)$ or the time domain signal $w(l)$ forming the NB-IoT DMRS sequence $r_{NB\text{-}PUSCH}(\cdot)$, a physical cell identity for at least a narrowband may be used as a parameter. For example, as the NB-IoT DMRS sequence, a PN sequence such as a gold sequence, or the like, or an orthogonal sequence may be used.

Also, the time domain signal $w(l)$ may be generated using the LTE DMRS base sequence having a length of L, and the frequency domain signal $r(k)$ may be separately defined to be used. For example, as the frequency domain signal $r(k)$ having a length of K, the use of a DFT sequence, a selection sequence, and a CAZAC sequence may be considered.

When the DFT sequence is used as the $r(k)$, NB-IoT terminals should have perfect timing advance and perfect frequency estimation to maintain orthogonality. The serving cell allocates each row or each column of a DFT matrix to the NB-IoT terminals through higher layer signaling. The serving cell may schedule the same subcarrier set to K number of NB-IoT terminals and allocate different DFT sequences to the NB-IoT terminals to orthogonalize intra-cell interference.

Meanwhile, if the NB-IoT terminals have transmission impairment, the selection sequence may be used to relatively reduce an influence of uplink interference. When the selection sequence is used as r(k), the serving cell may schedule the same subcarrier set to the K number of NB-IoT terminals and allocate different sequences allocated from an identity matrix to the NB-IoT terminals to orthogonalize intra-cell interference. A row or a column of the identity matrix is a selection sequence having a value of 1 only in one index and value of 0 in the other remaining indices. Thus, one subcarrier corresponding to a NB-IoT DMRS is selected to be UE-specific from the K number of scheduled subcarriers allocated to the NB-IoT terminals. The serving cell may allocate each row or each column of the identity matrix to the NB-IoT terminals through higher layer signaling. Since the NB-IoT PUSCH and the NB-IoT DMRS are time-division-multiplexed, the NB-IoT terminals may transmit the NB-IoT DMRS as a single tone in a corresponding uplink symbol, increase uplink transmission power by K times, and avoid interference between NB-IoT DMRSs used by other NB-IoT terminals within a cell through frequency division multiplexing. Also, the selection sequence may be generated as a function of a slot number and a cell identifier, as well as an NB-IoT terminal identifier. In such a case, since the NB-IoT terminals in which K number of same subcarrier sets are scheduled have different selection sequences, intra-cell interference may be orthogonalized. Also, since it is a function of a cell identifier, intra-cell interference may be randomized. Here, the cell identifier refers to a physical cell identifier for an NB or a virtual cell identifier configured by higher layer signalling.

Meanwhile, when K=1, it may be interpreted as r (k)=1, and thus, NB-IoT DMRS sequence $r_{NB-PUSCH}(\cdot)$ may be expressed as a time domain signal w(l) having a length of L. The time domain signal w(l) may be generated using L, the number of physical cell identifiers and slots for NB.

Also, when K>1, it may be interpreted as w(l)=1, and accordingly, NB-IoT DMRS sequence $r_{NB-PUSCH}(\cdot)$ may be expressed as a frequency domain signal r(k). In this case, the same NB-IoT DMRS sequence $r_{NB-PUSCH}(\cdot)$ may be mapped to each slot to which an NB-IoT DMRS symbol is allocated. The frequency domain signal r(k) may be generated using a physical cell identifier for NB.

Figure 10:
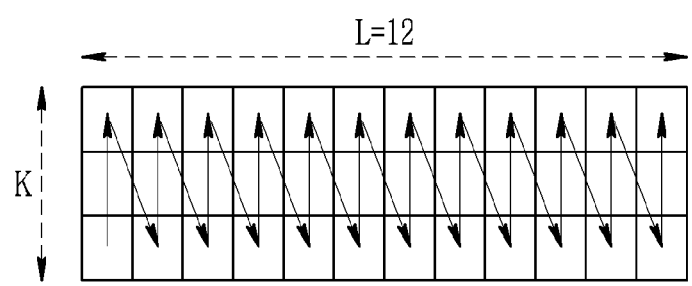
FIGS. 10 and 11 illustrate examples of RE mapping of a one-dimensional structure of an NB-IoT uplink DMRS.
Figure 11:
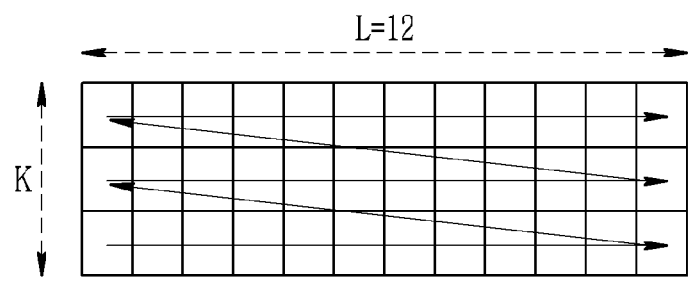

FIGS. 10 and 11 illustrate examples of RE mapping of a one-dimensional structure of an NB-IoT uplink DMRS.

Referring to FIGS. 10 and 11, a sequence s(n) having a length of (L×K) may be mapped to a symbol index and a subcarrier index.

For example, as illustrated in FIG. 10, the NB-IoT terminal maps the base sequence s(n) having a length of (L×K) to (L×K) number of resource elements in a manner of mapping the base sequence s(n) in an ascending order of subcarrier indices and subsequently increasing symbol indices. Here, the NB-IoT DMRS sequence $r_{NB-PUSCH}(\cdot)$ may be expressed as the base sequence s(n) having a length (L×K) as expressed by Equation 3.

$$r_{NB-PUSCH}(l,k) = s(lK+k) \qquad \text{(Equation e)}$$

Here, $0 \leq l < L$ and $0 \leq k < K$.

Alternatively, as illustrated in FIG. 11, the NB-IoT terminal may map the base sequence s(n) having a length of (L×K) to (L×K) number of resource elements in a manner of mapping the base sequence s(n) in an ascending order of symbol indices and subsequently increasing subcarrier indices. Here, the NB-IoT DMRS sequence $r_{NB-PUSCH}(\cdot)$ may be expressed by a base sequence s(n) having a length of (L×K) as expressed by Equation 4.

$$r_{NB-PUSCH}(l,k) = s(kL+l) \qquad \text{(Equation 4)}$$

Here, $0 \leq l < L$ and $0 \leq k < K$.

In Equation 3 and Equation 4, the base sequence s(n) may be generated to have PN properties or orthogonality. Or, the base sequence s(n) may be defined as the product of a sequence having pseudo-random properties and a sequence having orthogonality. In generating the base sequence s(n), a physical cell identifier for NB, or the like, may be used as a parameter.

Figure 12:
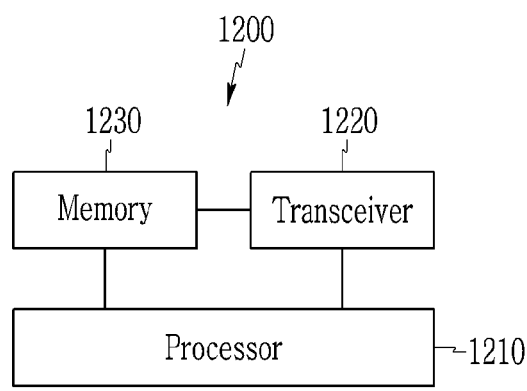
FIG. 12 is illustrates a reference signal transmitting device according to an exemplary embodiment of the present invention.

FIG. 12 is illustrates a reference signal transmitting device according to an exemplary embodiment of the present invention.

Referring to FIG. 12, a reference signal transmitting device 1200 includes a processor 1210, a transceiver 1220, and a memory 1230. The reference signal transmitting device 1200 may be implemented in an NB-IoT terminal.

The processor 1210 generates an NB-IoT DMRS sequence and maps the generated NB-IoT DMRS sequence to the L×K number of resource elements as illustrated in FIGS. 9 to 11. Here, as illustrated in FIGS. 5 to 7, the processor 1210 may map NB-IoT DMRS sequence to the L×K number of resource elements of the NB-IoT uplink subframe.

The transceiver 1220 may be connected to the processor 1210 to transmit and receive a wireless signal.

The memory 1230 may store a command to be conducted in the processor 1210 or may load a command from a storage device (not shown) and temporarily store the loaded command. The processor 1210 may execute a command stored in or loaded from the memory 1230. Also, the memory 1230 may store information related to an operation of the processor 1210.

The processor 1210 and the memory 1230 may be connected to each other via a bus (not shown), and an input/output interface (not shown) may be connected to the bus. Here, the transceiver 1820 may be connected to the input/output interface, and peripheral devices such as an input device, a display, a speaker, a storage device, and the like, may be connected to the input/output interface.

According to an exemplary embodiment of the present invention, a reference signal appropriate for an NB-IoT system may be provided.

The embodiments of the present invention may not necessarily be implemented only through the foregoing devices and methods but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting an uplink reference signal by a terminal, the method comprising:

generating an uplink reference signal corresponding to a plurality of resource elements in a scheduled resource allocation unit, wherein the scheduled resource allocation unit includes a first number of contiguous slots including a plurality of symbols in a time domain and a second number of contiguous subcarriers in a frequency domain; and mapping the generated uplink reference signal to the plurality of resource elements, wherein, provided the second number of the contiguous subcarriers is equal to 1, the uplink reference signal is generated using a physical cell identifier for a cell and the first number, wherein, provided the second number of the contiguous subcarriers is equal to 2 or greater, the uplink reference signal is generated using the physical cell identifier for the cell and the second number, and wherein the generating includes:
  when the second number is 1, generating the uplink reference signal from a first base sequence having a length corresponding to the first number of the contiguous slots, and
  when the second number is 2 or more, generating the uplink reference signal from a second base sequence having a length corresponding to the second number of the contiguous subcarriers.

2. The method of claim 1, wherein:
the uplink reference signal includes a demodulation reference signal (DMRS).

3. The method of claim 1, wherein:
the first number of the contiguous slots is equal to 2 or greater, and the second number of the contiguous subcarriers is equal to 1, or equal to 2 or greater.

4. The method of claim 1, wherein the mapping includes:
mapping the uplink reference signal to the second number of the contiguous subcarriers in an order,
increasing a symbol index, and
repeating the mapping of the uplink reference signal to the second number of the contiguous subcarriers in the order and the increasing of the symbol index.

5. The method of claim 1, wherein the mapping includes:
mapping the uplink reference signal to the allocated symbols of the first number of the contiguous slots in an order;
increasing a subcarrier index; and
repeating the mapping of the uplink reference signal to the allocated symbols of the first number of the contiguous slots in the order and the increasing of the subcarrier index.

6. The method of claim 1, wherein the generating includes:
generating the uplink reference signal using the product of a first signal having a length corresponding to the first number of the contiguous slots and a second signal having a length corresponding to the second number of the contiguous subcarriers.

7. The method of claim 6, wherein:
the first signal or the second signal are generated using a constant amplitude zero auto-correlation (CAZAC) sequence.

8. The method of claim 1, wherein:
one or more of the first base sequence and the second base sequence is generated to have pseudo-random (PN) properties or orthogonality.

9. The method of claim 1, wherein:
one or more of the first base sequence and the second base sequence is generated by the product of a sequence having pseudo-noise (PN) properties and a sequence having orthogonality.

10. A method for transmitting an uplink reference signal by a terminal, the method comprising:
generating an uplink reference signal corresponding to a plurality of resource elements in a scheduled resource allocation unit, wherein the scheduled resource allocation unit includes a first number of contiguous slots including a plurality of symbols in a time domain and a second number of contiguous subcarriers in a frequency domain; and mapping the generated uplink reference signal to the plurality of resource elements, wherein a slot among the first number of the contiguous slots includes a plurality of symbols, wherein the mapping includes allocating the uplink reference signal to one symbol in each of the first number of the contiguous slots, and wherein the generating includes:
  when the second number is 1, generating the uplink reference signal from a first base sequence having a length corresponding to the first number of the contiguous slots, and
  when the second number is 2 or more, generating the uplink reference signal from a second base sequence having a length corresponding to the second number of the contiguous subcarriers.

11. A method for transmitting an uplink reference signal by a terminal, the method comprising:
generating an uplink reference signal corresponding to a plurality of resource elements in a scheduled resource allocation unit, wherein the scheduled resource allocation unit includes a first number of contiguous slots including a plurality of symbols in a time domain and a second number of contiguous subcarriers in a frequency domain; and mapping the generated uplink reference signal to the plurality of resource elements, wherein a slot among the first number of the contiguous slots includes a plurality of symbols, wherein the mapping includes allocating the uplink reference signal to at least one symbol contiguously in a time axis in at least one of the first number of the contiguous slots, and wherein the generating includes:
  when the second number is 1, generating the uplink reference signal from a first base sequence having a length corresponding to the first number of the contiguous slots, and
  when the second number is 2 or more, generating the uplink reference signal from a second base sequence having a length corresponding to the second number of the contiguous subcarriers.

12. A device for transmitting an uplink reference signal, the device comprising:
a processor to:
  generate a demodulation reference signal (DMRS) corresponding to a plurality of resource elements in a scheduled resource allocation unit, wherein the scheduled resource allocation unit includes a first number of contiguous slots equal to or greater than 2 in a time domain and a second number of contiguous subcarriers equal to or greater than 1 in a frequency domain, and the first number of slots includes a plurality of symbols, and
  map the generated DMRS to the plurality of resource elements, wherein, provided the second number of the contiguous subcarriers is equal to 1, the processor generates the DMRS using a physical cell identifier a cell and the first number, and wherein, provided the second number of the contiguous subcarriers is equal to 2 or greater, the processor generates the DMRS using the physical cell identifier for the cell and the second number, and wherein, when the second number is 1, the processor generates the DMRS from a first base sequence having a length corresponding to the first number of the contiguous slots, and when the second number is 2 or more, the processor generates the DMRS from a second base sequence having a length corresponding to the second number of the contiguous subcarriers.

13. The device of claim 12, wherein:

the processor maps the DMRS to one symbol in each of the first number of the contiguous slots or maps the DMRS to at least one symbol contiguously in a time axis in at least one of the first number of the contiguous slots.

14. The device of claim 12, wherein:

the processor generates the DMRS from the product of a time domain signal having a first length and a frequency domain signal having a second length, maps the DMRS to the second number of the contiguous subcarriers, and sequentially maps the DMRS to allocated symbols of the first number of the contiguous slots.

15. The device of claim 12, wherein:

the processor first maps the DMRS to the second number of the contiguous subcarriers among the plurality of resource elements and subsequently increases a symbol index, or first maps the DMRS to the allocated symbols of the first number of the contiguous slots among the plurality of reference elements and subsequently increases a subcarrier index.

* * * * *